Patented Oct. 25, 1938

2,134,430

UNITED STATES PATENT OFFICE 2,134,430

RESINOUS REACTION PRODUCTS OF INNER ETHERS AND NATURAL RESIN ACIDS AND METHODS OF MAKING THE SAME

Rudolph Max Goepp, Jr., Tamaqua, Pa., assignor to Atlas Powder Company, Wilmington, Del., a corporation of Delaware No Drawing. Application December 28, 1936, Serial No. 117,883

12 Claims. (Cl. 260—104)

This invention relates to a new type of ester gum or artificial resin ester, and to the method of making same and more particularly it relates to the resinous reaction products of inner ethers, resulting from the intramolecular condensation of hexahydric polyhydric alcohols, and natural resin acids.

It is an object of my invention to provide an ester gum having novel and superior characteristics and constitution which has wide applicability in the industries and great utility in coating compositions.

It is a further object of my invention to provide a novel process of making the resinous product whereby difficulties previously encountered in the esterification of the natural resin acid with hexahydric alcohols are avoided.

Other objects of my invention will appear from the specification and claims.

This invention contemplates the production of resinous materials of low acid number comprising the resinous reaction products of a natural resin acid and an inner ether of a hexahydric alcohol.

The resinifying acid may be a natural resin acid such as common rosin or colophony as it is commercially available, or it may be abietic acid either in pure form or containing various impurities.

The inner ether forming the resinous reaction product with the acid may be employed directly in the reaction, or advantageously the inner ether may be formed under the conditions of and during the reaction by using a hexahydric alcohol as the initial material. The inner ethers may be unsubstituted or may contain such non-functional substituents as do not destroy the ring formation or prevent the esterification of the hydroxyl groups during the reaction. The inner ethers may be defined as cyclic carbon-oxygen compounds containing one cyclic oxygen per ring (known as an oxido ring) and derived from a straight chain hexahydric alcohol by intramolecular condensation. If only one molecule of water is removed by the intramolecular condensation a monoanhydro derivative containing only one carbon-oxygen ring is obtained. If the condensation removes two molecules of water from the alcohol, a dianhydro compound containing two carbon-oxygen rings, which may or may not be of the condensed type, is obtained. The number of members in the ring and the number of oxido rings in the inner ether which are possible depend upon the number and arrangement of the hydroxyl and non-hydroxyl bearing carbon atoms in the chain of the polyhydric alcohol from which the inner ether is derived.

The polyhydric alcohols used in the preparation of the inner ethers and applicable for direct use in the process are the aliphatic straight chain hexahydric alcohols whose formula may be represented by $HOCH_2$—$(CHOH)_4$—$CH_2OH$. The hexahydric alcohols may contain alkyl, aryl or aralkyl or other non-functional groups, so long as the basic characteristics of the alcohol are maintained and the intramolecular condensation can take place. Mixtures of the various polyhydric alcohols of the type contemplated herein may be employed if desired. Examples of the hexahydric alcohols are sorbitol, mannitol, dulcitol and iditol. As examples of the hexahydric alcohols containing non-functional groups, the hydrocarbon and alkoxy or aryloxy hydrocarbon ethers of the alcohols may be cited, for example, mono- or di-benzyl sorbitol or mono- or di-ethyl mannitol.

In the intramolecular condensation of the hexahydric alcohol 4 to 6 membered carbon-oxygen rings may be formed. If the hydroxyl bearing carbon atoms through which the intramolecular condensation takes place are separated by only one carbon atom, whether this be a hydroxyl or non-hydroxyl bearing carbon atom, 4 membered carbon-oxygen rings only are possible; if they are separated by two carbon atoms, 5 membered rings are obtained; and if they are separated by three carbon atoms, then 6 membered rings are obtained. Whether in any particular intramolecular condensation a mono- or di-anhydro compound is formed depends generally upon the conditions of the reaction, and it is possible to form dianhydro compounds containing different membered carbon-oxygen rings, for example, a compound containing a 4- and a 6-membered ring. As a result of the condensation of the polyhydric alcohols a mixture of the various inner ethers may be formed.

In order that the structures of certain of the inner ethers may be illustrated, some of those which may be formed frmo the hexahydric straight chain alcohols are as follows:

The 4-membered oxido ring, known as an oxidopropan ring:

or

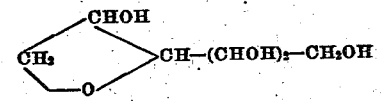

The 5-membered oxido ring, known as a furan ring:

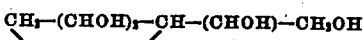

or

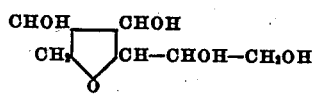

The 6-membered oxido ring, known as a pyran ring:

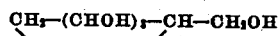

or

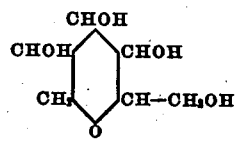

The dianhydro compound containing two condensed 5-membered oxido rings, known as furofuran rings:

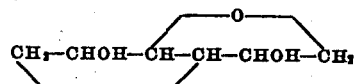

or

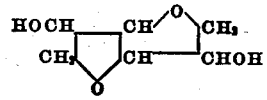

It is to be understood, of course, that the structural formulae hereinabove showing the various rings are merely by way of example and that the ring formation may take place between any of the other non-adjacent hydroxyl bearing carbon atoms of the alcohol. With the straight chain hexahydric alcohols, the inner ether containing the furan ring appears to be the main product obtained as the result of the intramolecular condensation reaction under usual conditions, although smaller amounts of the other inner ethers of both the mono- and di-anhydro type may be present. The inner ethers of the various polyhydric alcohols may also be designated by names derived from the stem of the parent alcohol by adding the characteristic suffix "itol", for the parent alcohol; "itan", for the cyclic monoanhydro derivative or inner ether; and "ide", for the dianhydro derivative, the dicyclic inner ether: thus, mann-itol, mann-itan, mann-ide; dulc-itol, -itan, -ide, etc. In this connection it may be mentioned that mannide and isomannide have been used for two definite chemical individuals, but I prefer to consider the terms "itan" and "ide" as descriptive of the classes of mono- and di-anhydro ethers of polyhydric alcohols.

As pointed out, the inner ether may be employed directly in the reaction with the natural resin acid such as rosin or abietic acid, or the hexahydric alcohol may be used and the inner ether formed during the course of the formation of the resin ester. The same type of resin ester is formed in both cases. As the most convenient method of obtaining the inner ethers is by the condensation of the hexahydric alcohols, usually the intermediate step involving the preparation and separation of the inner ether is dispensed with and the rosin or abietic acid is reacted directly with the hexahydric alcohol. If desired the inner ether may be obtained from the hexahydric alcohol under any suitable dehydrating conditions; for example, by simple heating at temperatures of 140° C. or upwards. Preferably, however, the heating is carried out in the presence of a dehydrating catalyst of either a basic or acidic nature at temperatures of 140° C. and upwards. The ethers when formed are preferably purified by vacuum distillation.

When the hexahydric alcohol is employed as the original reactant, the evidence points to the fact that the intramolecular condensation forming the inner ether takes place before the resin forming reaction, but part of the resin forming reaction may possibly take place first. If the latter does occur, however, it is to be understood that it falls within the scope of the invention and within the claims. The claims reciting the resinification of the inner ether are to be understood to include not only the use of the inner ether as the original reactant but also the use of the hexahydric alcohol from which the inner ether is formed.

The useful properties of these resin esters are essentially due to the reduction in the acidity of the otherwise rather satisfactory rosin so that it can be used in varnishes and lacquers. However, the development of a suitable process for reducing the degree of acidity has been accompanied with difficulties. It has been found that the reaction of hexahydric alcohols or their inner ethers with natural resin acids is a complicated process and cannot be compared with simple esterification processes, such as the esterification of ethyl alcohol by acetic acid. Where a hexahydric alcohol is used as the starting material only a fraction of the total hydroxyl present is active in the resin forming reaction. The original six hydroxyls are diminished by two due to the formation of the tetrahydric monoanhydro derivative. The formation of some dianhydro derivatives probably occurs during the process, thereby further reducing the number of available hydroxyls. On the acid side, the unreacted rosin tends to break down under resinifying temperatures with the formation of more volatile rosin oils, chiefly inert terpene hydrocarbons such as pinene and dipentene, but containing also acidic materials more volatile than the original rosin. Furthermore, the inner ether-rosin ester undoubtedly undergoes further reaction and decomposition during the resinifying process. Although the finished material is designated as an "ester" gum, it is really a complex rosin-inner ether resin. Accordingly, the use of stoichiometric proportions of acid and hydroxyl in the production of these resin esters does not lead to neutral, completely reacted preparations.

Heretofore, as in German Patent No. 500,504, it has been proposed that hexahydric straight chain alcohols be reacted with rosin or abietic acid to form resin esters. However, the products previously obtained were unsatisfactory due to their tendency to retain a high degree of acidity. Since the purpose of esterifying rosin is to reduce its acidity to a point where the rosin can be used in varnishes and lacquers, a product of high acid number is of little utility. Moreover, attempts to reduce the acidity of such reaction products have been attended with difficulties. Jetting with inert gas during the esterification process is helpful in reducing acid number. However, if jetting alone is relied upon to obtain a resin ester of low acid number, it must be carried out over long periods of time, thereby reducing the yield of resin ester as well as causing inconvenience in the manufacturing process.

On the other hand, I have found that indiscriminate reduction of the ratio of acid to alcohol in an effort to reduce the acid number of the resin ester tends to increase the cost and the color of the resinous product. The alcohol is the more expensive ingredient, and reduction of the ratio may increase the cost of the product above that of resin esters formed with a high ratio of acid to alcohol jetted over extended periods to reduce the acid number at the expense of yield. Moreover, the increased color of the products obtained when using very low ratios is objectionable.

I have found that when it is desired to produce these resin esters having acid numbers in the range below 35, the resinification must be conducted with a ratio of not more than 3 equivalents of acid per mol of hexahydric alcohol or inner ether thereof if the reaction is to be performed in minimum time and a high yield is to be obtained. By "equivalent of acid" or "equivalent of rosin" as used herein is meant the equivalent weight of acid or rosin, namely, that quantity of acid or rosin which contains unit weight of replaceable hydrogen. Acid number is defined as the number of milligrams of KOH needed to neutralize one gram of the resin ester and is determined by titrating a solution of the resin ester in neutral solvents directly with the alkali. Although with comparable reaction periods and yields, the acid number of the reaction product decreases with decrease in the ratio of acid to alcohol until a ratio of 3 is reached, the acid number of the product does not become materially lower when the reaction is carried out with ratios substantially below 3. This ratio is critical therefore with respect to the reaction of rosin and hexahydric alcohols or their inner ethers where the esterification is carried out until the resin ester has an acid number below 35.

Preferably the esterification process is conducted with a ratio above 2.25 equivalents of acid per mol of alcohol or ether thereof. As previously pointed out, a reduction in the ratio of acid to alcohol decreases the proportion of the less expensive of the two ingredients. Consequently, a substantial reduction of the ratio below the critical point is undesirable, since for given yields and acid numbers, the quantity of rosin esterified is diminished with lower ratios. Moreover, with lower ratios, the color of the resinous product is increased.

In the following examples, the process of the present invention using ratios of not more than 3 equivalents of acid per mol of hexahydric alcohol or inner ether thereof, is compared with processes using higher ratios. In these examples the molar ratios of rosin to hexahydric alcohol have been determined by calculation of the equivalent weight or apparent molecular weight of rosin. Since commercial rosin or abietic acid is not of definite chemical formula, the equivalent weight of the rosin is determined from its acid number, i. e., the number of milligrams of KOH required to neutralize one gram of the rosin. If the acid number of the rosin is 170, its equivalent weight would be X in the following equation:

$$0.170 : 1 = 56.1 : X$$

where .170 is the weight of KOH in grams required to neutralize 1 gram of rosin and 56.1 is the molecular weight of KOH. Evaluating, the value X would be 330, which in fact represents the equivalent weight of the rosin used in each of the examples prepared as follows:

Powdered rosin was charged into a vessel, and the temperature raised rapidly to 120° C. At this point sorbitol was introduced either in powdered solid form, or as a syrup. The moisture content of the syrup should be below 15% to prevent frothing. With stirring maintained continuously, and a slow stream of carbon dioxide passing through the mixture, the temperature was raised at the rate of 1° C. per minute until a temperature of 300° C. was attained. The temperature was maintained at 295° C. to 300° C. for a period of three hours, with carbon dioxide continuously passing through the mass. The finished resin was then allowed to cool under carbon dioxide to 200° C. before pouring.

| Example No. | 1 | 2 | 3 | 4 |
|---|---|---|---|---|
| Weight ratio rosin sorbitol | 3.6/1 | 5/1 | 6.5/1 | 8.3/1 |
| Acid equivalents per mol of sorbitol | 2/1 | 2.8/1 | 3.6/1 | 4.6/1 |
| Time, hours | 3 | 3 | 3 | 3 |
| Temp., °C | 300 | 300 | 300 | 300 |
| Acid number | 17 | 19 | 40 | 58 |
| Yield, percent | 77 | 72 | 76 | 78 |
| Hess Ives color units | 75 | 40 | 60 | 57 |

It can be seen from the foregoing examples that when the reaction is carried out with ratios of more than 3 equivalents of acid per mol of hexahydric alcohol, the acid numbers of the resin esters are high whereas ratios below 3 produce resin esters of uniformly low acid number, other conditions being the same. In Example 2, a ratio of 2.8 produced a resin ester of acid number 19 whereas Example No. 3 at a ratio of 3.6 produced a resin of acid number 40. Resins of low acid numbers may be produced using these high ratios, but the time of reaction must be increased, or the yield decreased, or both, if this is to be accomplished. As illustrative, reaction was required for 6½ hours at 300° C., other conditions remaining the same, to bring the acid number of the reaction product of Example 3 down to 18. With increased jetting, reaction was required for 5¼ hours at 300° C., to comparably reduce the acid number of the reaction product of Example 4, but this resulted in the lowering of yield to about 50%.

It is to be understood that the examples set forth above are non-limiting and are merely for the purpose of describing and contrasting the process of the present invention with the unsatisfactory methods beyond the scope thereof. For example, although either jetting with an inert gas or vacuum distillation is helpful in reducing the acidity of the resin ester, the effect is general and tends to reduce the acid number, regardless of the ratios employed. Consequently, the present invention is not to be limited with respect thereto and can be carried out with or without jetting or vacuum distillation so long as air is excluded and the volatiles are removed from the reaction mixture. An extension of the time of reaction is also generally helpful in reducing the acidity of the product. Consequently, it can be seen that the esterification may be carried out in any suitable manner and at any elevated temperature which results in the formation of resinous esterified inner ethers. Preferably, temperatures of from 285 to 300° C. are employed. Harder resins may be obtained at the expense of yield and color by raising the temperature to 320° C. No significant gain in color is achieved, however, by employing temperatures below 285° C. and the time of reaction is considerably lengthened thereby.

Although resinous reaction products of sorbitol are the subject matter of the foregoing examples, it is to be understood that other hexahydric alcohols, their inner ethers or mixtures thereof, may be employed if so desired. For example, an ester gum having a acid number in the neighborhood of 14 may be obtained by reacting rosin of equivalent weight 330 with monoanhydro sorbitol (sorbitan) in a ratio of approximately 2.5 equivalents of acid per mol of the inner ether and employing the technique set forth above.

Moreover, in place of pure hexahydric alcohols, the technical grade of syrups prepared by the catalytic hydrogenation or electrolytic reduction of sugars and containing other poly-hydric compounds may be employed. Also, the rosin utilized need not have the particular characteristics of the rosin of the foregoing examples, and it is to be understood that by the term "rosin" in the appended claims I mean any grade of gum or wood rosin, or abietic acid.

If so desired, the properties of the resin ester may be modified by replacing a portion of the rosin with other suitable organic acids of either the aliphatic or aromatic group, or by the addition of suitable softening agents such as castor oil.

Considerable modification is possible in the choice of ingredients employed in the esterification reaction as well as in the manipulative steps utilized in the processes, without departing from the essential features of the invention.

What I claim is as follows:—

1. The process of making a resinous reaction product of an inner ether and rosin which comprises heating together at elevated temperature and with exclusion of air, rosin and a polyhydroxy inner ether derivable from a straight chain hexahydric alcohol and having at least one 4 to 6 membered carbon-oxygen ring, the number of equivalents of rosin present in the reacting mixture being not more than about three equivalents per mol of ether, and removing volatiles from the reaction mixture.

2. The process of making a resinous reaction product of an inner ether and rosin which comprises heating together at elevated temperature and with exclusion of air, rosin and a polyhydroxy inner ether derivable from a straight chain hexahydric alcohol and having at least one 4 to 6 membered carbon-oxygen ring, the number of equivalents of rosin present in the reacting mixture being in the neighborhood of 2.25 to 3 equivalents per mol of ether, and removing volatiles from the reaction mixture.

3. The process of making a resinous reaction product of an inner ether and rosin which comprises heating together at elevated temperature and with exclusion of air, rosin and a polyhydroxy inner ether derivable from sorbitol and having at least one 4 to 6 membered carbon-oxygen ring, the number of equivalents of rosin present in the reacting mixture being not more than about three equivalents per mol of ether and removing volatiles from the reaction mixture.

4. The process of making a resinous reaction product of an inner ether and rosin which comprises heating together at elevated temperature and with exclusion of air, rosin and a polyhydroxy inner ether derivable from sorbitol and having at least one 4 to 6 membered carbon-oxygen ring, the number of equivalents of rosin present in the reacting mixture being in the neighborhood of 2.25 to 3 equivalents per mol of ether continuing the heating and removing volatiles from the reaction mixture until the reaction product has an acid number of not more than 35.

5. The process of making a resinous reaction product of an inner ether and rosin which comprises heating together at elevated temperature and with exclusion of air, rosin and a polyhydroxy inner ether derivable from mannitol and having at least one 4 to 6 membered carbon-oxygen ring, the number of equivalents of rosin present in the reacting mixture being not more than about three equivalents per mol of ether, and removing volatiles from the reaction mixture.

6. The process of making a resinous reaction product of an inner ether and rosin which comprises heating together at elevated temperature and with exclusion of air, rosin and a polyhydroxy inner ether derivable from mannitol and having at least one 4 to 6 membered carbon-oxygen ring, the number of equivalents of rosin present in the reacting mixture being in the neighborhood of 2.25 to 3 equivalents per mol of ether, continuing the heating and removing volatiles from the reaction mixture until the reaction product has an acid number of not more than 35.

7. The process of making resinous reaction products of an inner ether and rosin which comprises mixing together at 120° C. rosin and a polyhydric material selected from the group consisting of the straight chain hexahydric alcohols and the inner ethers derivable from straight chain hexahydric alcohols and having at least one 4 to 6 membered carbon-oxygen ring, the number of equivalents of rosin present in the mixture being not more than about three equivalents per mol of polyhydric material, raising the temperature at a substantially uniform rate in the course of three hours to a temperature of from 285 to 320° C., and agitating and heating in an atmosphere substantially free from air for at least three hours at a temperature of from 285 to 320° C. while removing volatile material from the reaction mass.

8. The resinous reaction product of rosin and an inner ether of a straight chain hexahydric alcohol made in accordance with the process of claim 1 and having an acid number of not more than 35.

9. The resinous reaction product of rosin and an inner ether of a straight chain hexahydric alcohol made in accordance with the process of claim 2 and having an acid number of not more than 35.

10. The resinous reaction product of rosin and an inner ether of sorbitol made in accordance with the process of claim 3 and having an acid number of not more than 35.

11. The resinous reaction product of rosin and an inner ether of mannitol made in accordance with the process of claim 5 and having an acid number of not more than 35.

12. The resinous reaction product of rosin and an inner ether of a straight chain hexahydric alcohol made in accordance with the process of claim 7 and having an acid number of not more than 35.

RUDOLPH MAX GOEPP, Jr.